(12) United States Patent
Ghafourifar et al.

(10) Patent No.: US 12,067,063 B2
(45) Date of Patent: *Aug. 20, 2024

(54) TEMPORAL TRANSFORMATION OF LOCATION-BASED QUERIES

(71) Applicant: Entefy Inc., Palo Alto, CA (US)

(72) Inventors: Alston Ghafourifar, Los Altos Hills, CA (US); Brienne Ghafourifar, Los Altos Hills, CA (US); Mehdi Ghafourifar, Los Altos Hills, CA (US); Neil Achtman, Mountain View, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/146,932

(22) Filed: Dec. 27, 2022

(65) Prior Publication Data

US 2023/0131789 A1    Apr. 27, 2023

Related U.S. Application Data

(63) Continuation of application No. 16/889,587, filed on Jun. 1, 2020, now Pat. No. 11,537,676, which is a continuation of application No. 15/858,749, filed on Dec. 29, 2017, now abandoned.

(51) Int. Cl.
| | |
|---|---|
| *G06F 7/00* | (2006.01) |
| *G06F 16/00* | (2019.01) |
| *G06F 16/29* | (2019.01) |
| *G06F 16/9038* | (2019.01) |
| *G06F 16/9535* | (2019.01) |

(52) U.S. Cl.
CPC .......... *G06F 16/9535* (2019.01); *G06F 16/29* (2019.01); *G06F 16/9038* (2019.01)

(58) Field of Classification Search
None
See application file for complete search history.

(56) References Cited

U.S. PATENT DOCUMENTS

| | | |
|---|---|---|
| 2012/0010803 A1 | 1/2012 | Min et al. |
| 2013/0297551 A1 | 11/2013 | Smith et al. |
| 2014/0181083 A1 | 6/2014 | Macho et al. |
| 2016/0140146 A1 | 5/2016 | Wexler et al. |
| (Continued) | | |

*Primary Examiner* — Tuan A Pham
(74) *Attorney, Agent, or Firm* — Haynes and Boone, LLP

(57) ABSTRACT

A system and method for transforming location-based data queries into temporal domain by leveraging a location-to-time knowledge conversion graph. In some systems which contain diverse sets of data objects, only certain objects may contain explicit location data, while others may not. Therefore, queriability of this diverse data by location properties would likely yield incomplete results. In some embodiments, this method allows for the transformation and augmentation of a given data query containing location-based filtering properties into a time-region-based lookup, wherein a given location has been assigned to a time region in the given data graph and all data events within that time region may be augmented with location metadata automatically in the knowledge graph. Over time, a system utilizing these embodiments can offer comprehensive location-based data services and insights with a diverse set of data objects that exists and not all objects contain explicit location information.

17 Claims, 8 Drawing Sheets

(56) References Cited

U.S. PATENT DOCUMENTS

| | | | |
|---|---|---|---|
| 2016/0170007 A1* | 6/2016 | Ryan | G01S 5/16 315/294 |
| 2017/0098321 A1 | 4/2017 | Jung et al. | |
| 2017/0199050 A1* | 7/2017 | Masuko | G06F 16/00 |
| 2017/0270790 A1 | 9/2017 | Neiger et al. | |
| 2017/0293673 A1 | 10/2017 | Purumala et al. | |
| 2018/0255267 A1* | 9/2018 | Ido | G06F 16/51 |
| 2019/0034734 A1 | 1/2019 | Yen et al. | |
| 2019/0294629 A1 | 9/2019 | Wexler et al. | |

\* cited by examiner

TEMPORAL TRANSFORMATION OF LOCATION-BASED QUERIES

CROSS REFERENCE TO RELATED APPLICATION

This application is a continuation of U.S. application Ser. No. 16/889,587, filed Jun. 1, 2020, which is a continuation of U.S. application Ser. No. 15/858,749, filed Dec. 29, 2017, all of which are incorporated herein in their entirety by reference.

TECHNICAL FIELD

This disclosure relates generally to converting a location-based query to a time-based query.

BACKGROUND

Many data items are generated with location information embedded as metadata. For example, an image file may include global positioning system (GPS) data indicating where the image file was created. Location data associated with data items may be used for a variety of purposes. For example, an individual may query a system that tracks data items to determine which data items the individual generated while on a trip to Europe. However, some data items may not be associated with location data. Such data items may not be considered by systems and applications that operate on such data based on location, therein reducing the scope or efficacy of location-based queries with regard to retrieval of diverse data in a given system.

DETAILED DESCRIPTION

Figure 1:
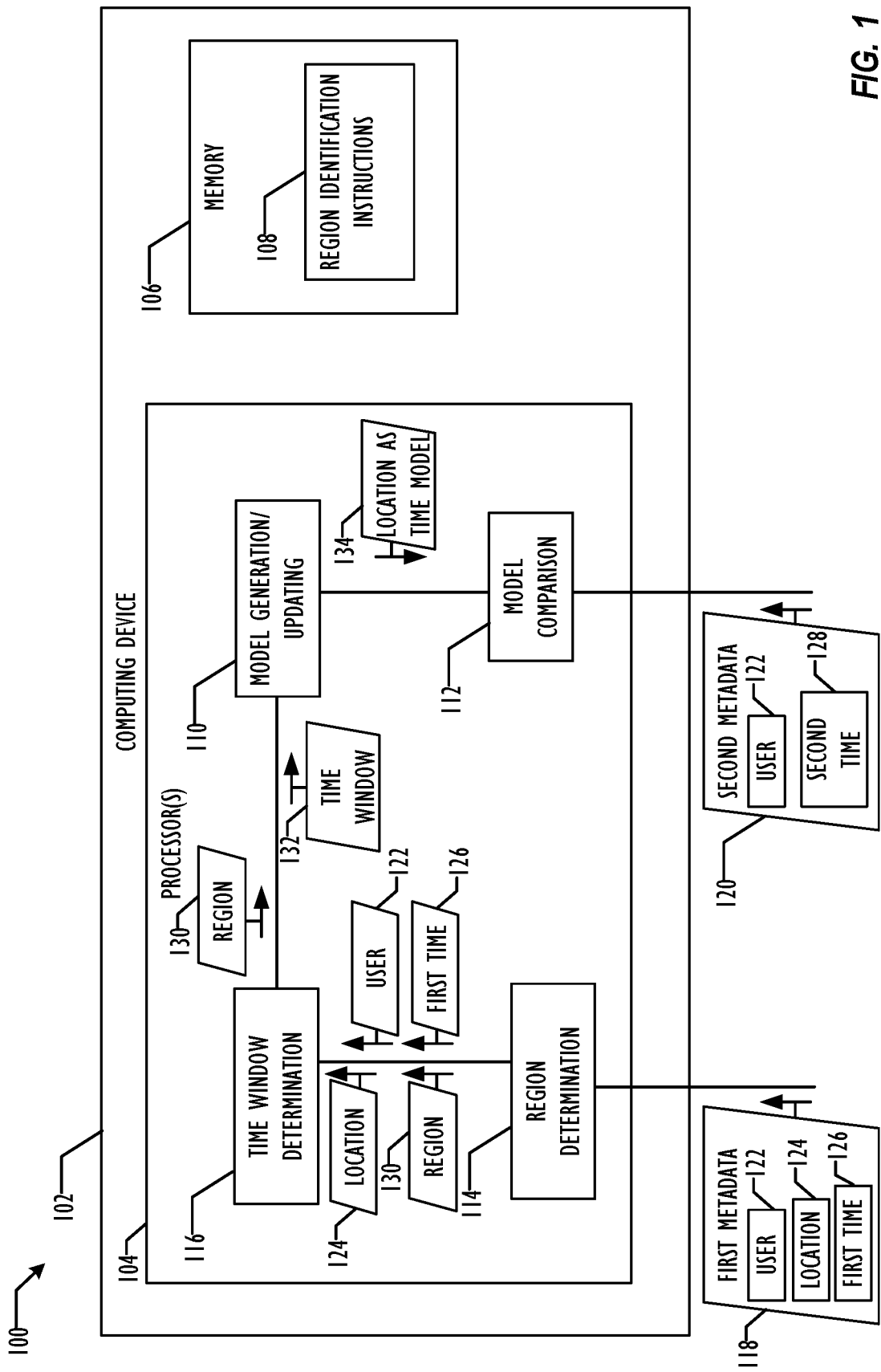
FIG. 1 is a block diagram illustrating a system for determining a region in which data was generated.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "user device" can refer to any programmable device that is capable of communicating with another programmable device across any type of network.

As data items are generated by computing devices, some data items are tagged with location information. For example, an image file may include metadata indicating a location at which a camera device generated the image file. However, some data items do not include such location metadata. For example, a camera device may generate an image file that lacks location metadata because the camera device does not include a location sensor, because a location services option of the camera device is disabled, or for a variety of other reasons. In another example, a data item may not include location metadata because a file type of the data item may not support or may not be commonly associated with location data. Accordingly, common tools for editing the file type of the data item may not have the ability to tag the data item with location metadata. In one or more embodiments, a technique is provided which allows for identifying a region (e.g., a country, a state/province, a city, a neighborhood, etc.) associated with generation of a data item absent an explicit indication of the region. In addition to image files, data items may include electronic mail (E-mail) data, contact data, social media check-in data, purchase data, or any other type of data or metadata.

In a particular example, a system or method generates a data structure (e.g., a timeline) associated with a user based on data items associated with the user that do include location information. For example, the system or method may generate a timeline indicating that the user was in Region 1 at Time 1 based on location metadata associated with an E-mail (such as an IP address lookup) generated by a device or account associated with the user. The system or method may further update the timeline to indicate that the user was in Region 2 at Time 2 based on location metadata associated with an image file generated by a device or account associated with the user. Using the data structure, the system or method may determine region information associated with a data item that lacks location information. To illustrate, the system or method may determine that a contact was added to an account associated with the user while the user was in Region 1 by comparing time information (e.g., a timestamp) associated with the contact to the timeline associated with the user. Accordingly, the system or method enables identification of region information associated with a data item that is not associated with location metadata.

In some examples, a system or method may support transformation of queries for data items from a location domain into a time domain. For example, the system or method may receive a location-based query for data items generated by a user while the user was in Location 1. Using the timeline described above, the system or method may transform the location-based query into a time-based query for data items generated by the user between Time 1 and Time 3. Accordingly, the system or method enables searching for data items that were generated in a region even in cases where one or more of the data items generated in the region are not tagged with location metadata. The time domain query may be resolved locally or transmitted to another device or service for resolution. To illustrate, location domain to time domain query transformation may be provided by one system/device to another system/device as a service.

Referring now to FIG. 1, a block diagram illustrating a system 100 for determining a region in which data was generated, according to one or more embodiments, is presented. FIG. 1 includes a computing device 102. The computing device 102 may correspond to a server device or to any other type of computing device. According to some embodiments, the computing device 102 may be responsible for storing, indexing, managing, searching, relating, and/or retrieving content (including communications messages and data files of all types) for various users of a communication system. The computing device 102 includes one or more processors 104 and a memory 106. The processor(s) 104 may include a central processor unit (CPU), a digital signal processor (DSP), a graphics processing unit (GPU), some other type of processor, or a combination thereof. The memory 106 includes a hard disk drive, a flash drive, random access memory, any other type of computer readable storage device, or a combination thereof. As used herein, a computer readable storage device refers to a machine, manufacture, or composition of matter. A computer readable storage device is not a signal. The memory 106 may store data and executable code. In the illustrated example, the memory 106 stores region identification instructions 108. The region identification instructions 108 may be executable by the processor(s) 104 to perform any of the operations or methods described herein.

The processor(s) 104 include a region determination module 114, a time window determination module 116, a model generation/updating module 110, and a model comparison module 112. The region determination module 114 is configured to determine a region associated with a data item based on location data (e.g., location metadata) included in metadata associated with the data item. The time window determination module 116 is configured to determine a time window associated with a user being in the region based on time data (e.g., a timestamp) included in the data item and an estimated amount of time it would take the user to exit the region. The model generation/updating module 110 is configured to generate or update a model (e.g., a timeline) that indicates regions associated with the user over time-based on the time window. The model comparison module 112 is configured to compare time data of a data item that does not include location information (e.g., location metadata) to the model to determine a region in which the data item was generated. Each of the modules 110-116 may correspond to software executed by the processor(s) 104 responsive to the region identification instructions 108, dedicated hardware of the processor(s) 104, or a combination thereof. While illustrated as distinct modules, functionality of one or more of the modules 110-116 may be combined. Further, functionality of one or more of the modules 110-116 may be separated into multiple distinct modules.

In the illustrated example of FIG. 1, the computing device 102 receives first metadata 118 associated with a first data item. The first metadata 118 includes data indicating a user 122, a location 124, and a first time 126. The computing device 102 may or may not receive the first data item. The computing device 102 may store the first metadata 118 (e.g., in the memory 106).

The data indicating the user 122 may correspond to a globally unique user identifier, a user name, an account name, another type of identifier or a combination thereof. In some implementations, the data indicating the user 122 may indicate an account or device rather than an individual. The data indicating the location 124 may correspond to global positioning system (GPS) data generated by a GPS sensor, an access point (e.g., cellular tower) identifier, to semantic content-based location identifier, to an internet protocol (IP) address, to some other type of location data, or a combination thereof. A semantic content-based location identifier is a location identifier derived from semantic content of a data item. The data indicating the first time 126 may correspond to a timestamp. In a particular example, the first metadata 118 corresponds to an image file and indicates that the image file was generated by User 1 at Location 1 at Time 1.

While FIG. 1 illustrates the computing device 102 receiving the first metadata 118, in some examples, the computing device 102 generates the first metadata 118 or a portion thereof based on the first data item or other associated metadata. For example, the computing device 102 may generate the data indicating the user 122 based on metadata identifying a particular device or account and a mapping of the particular device or account to the user 122. To illustrate, the computing device 102 may generate data indicating User 1 generated an image file in response to metadata of the image file indicating that a camera of User 1 generated the image file. As another example of metadata generation, the computing device 102 may generate the data indicating the location 124 based on semantic content of the data item. To illustrate, the computing device 102 may generate location data indicating that an E-mail was written in Region 1 in response to determining that a body of the E-mail refers to Region 1 (or a particular location within Region 1). In another illustrative example, the computing device 102 may generate location data indicating that an E-mail was written in Region 1 in response to determining that the E-mail originated from an IP address in Region 1. In a further illustrative example, the computing device 102 may generate location data indicating that an E-mail was written in Region 1 in response to determining that the E-mail was transmitted through a cellular tower in Region 1.

The region determination module 114 receives the first metadata 118 and identifies a region 130 that includes the location 124. For example, the region determination module 114 may determine that an image file that was generated in Region 1 in response to associated metadata indicating that the image file was generated at a location (e.g., a city) within Region 1.

Based the first time 126 and an estimated amount of time it would take the user 122 to exit the region 130 when starting at the location 124, the time window determination module 116 determines a time window 132 during which the user 122 is predicted to have been in the region 130. For example, in response to determining that User 1 was located at Location 1 at Time 1 and that exiting Region 1 from Location 1 while traveling at a predicted speed of User 1 would take 1 day, the time window determination module 116 may determine that User 1 was located in Region 1 at least from Time 1±1 day. In some examples, the computing device 102 determines the estimated amount of time by analyzing historical locations of the user with respect to time to determine an average predicted speed of the user 122. In addition, or in the alternative, the computing device 102 may determine the predicted speed of the user 122 by analyzing a context associated with the user 122 and stored in the memory 106. The context may include information such as whether the user 122 owns a car, has bought a plane ticket, is scheduled to travel, etc.

The model generation/updating module 110 generates or updates a location as time model 134 (e.g., a timeline) based on the region 130 and the time window 132. For example, the model generation/updating module 110 may update a timeline to indicate that User 1 was in Region 1 from Time 1-Time 3 in response to the time window 132 indicating that User 1 was in Region 1 during that time. In some implementations, the location as time model 134 (e.g., the timeline) specific to the user 122 and the computing device 102 generates a location as time model for each user associated with data items for which the computing device 102 obtains metadata. In some implementations, the computing device 102 may maintain a location as time model for registered users (e.g., subscribers of a communication service) as well as unregistered users. In response to each new user registration, the computing device 102 may determine whether the new user corresponds to an unregistered user for which a location as time model has been generated.

Updating the location as time model 134 may include reconciling conflicting time windows. For example, if the model generation/updating unit 110 receives an indication that User 1 was in Region 1 from Time 1-Time 3 but the timeline includes a second time window indicating that User 1 was in Region 2 at Time 2, the model generation/updating unit 110 may reconcile the conflicting time windows. In some examples, the model generation/updating module 110 may update the location as time model 134 to indicate both time windows in response to a conflict. For example, the model generation/updating unit 110 may update the timeline to indicate both that User 1 was in Region 1 from Time 1-Time 3 and that User 1 was in Region 2 at Time 2. In other examples, the model generation/updating module 110 may reconcile conflicting time windows based on priorities associated with the conflicting time windows. In some implementations, the model generation/updating module 110 determines priority of a time window based on a type of location data used to identify a region associated with the time window. In particular, GPS data may have a first priority, access point data may have a second priority, semantic-content based location data may have a third priority, and IP address based location data may have a fourth priority. Thus, if the time window determination module 116 generated a first time window indicating that User 1 was in Region 1 at Time 2 based on an E-mail originating from an IP address in Region 1 (e.g., fourth priority data) and generated a second time window indicating that User 1 was in Region 2 from Time 1-Time 3 based on an image file that included GPS metadata (e.g., first priority data), the second time window may take priority. Accordingly, the model generation/updating module 110 may update the timeline by discarding the first time window and adding the second time window.

Updating the location as time model 134 may further include merging two time windows that overlap in time and indicate the same region. For example, if the timeline includes a first time window indicating that User 1 was in Region 1 from Time 3-Time 6 and the model generation/updating module 110 receives a second time window indicating that User 1 was in Region 1 from Time 1-Time 3, the model generation/updating module 110 may merge the time windows to indicate that User 1 was in Region 1 from Time 1-Time 6.

Using the location as time model 134, the model comparison module 112 may determine regions in which data items associated with the user 122 but that do not include location data were generated. In the illustrated example, the computing device 102 receives second metadata 120 associated with a second data item. As with the first data item, the computing device 102 may or may not receive the second data item. Further, as explained above with reference to the first metadata 118, elements of the second metadata 120 may be generated at the computing device 102. The second metadata 120 includes data indicating the user 122 and a second time 128. However, the second metadata 120 may not include allocation data. Based on the data indicating the user 122, the model comparison module 112 may access the location as time model 134 to determine a region in which the second metadata 120 was generated. The model comparison module 112 compares the second time 128 to the location as time model 134 to identify a region in which the second data item was generated. In particular, in response to determining that the second time 128 falls within the time window 132, as indicated by the location as time model 134, the model comparison module 112 may determine that the second data item was generated within the region 130. To illustrate, in response to determining that that contact data was added to User 1's contacts list at Time 2 and that User 1's timeline indicates User 1 was in Region 1 at Time 2, the model comparison module 112 may determine that the contact data was generated while User 1 was in Region 1.

In situations in which the second time 128 does not match any time window identified by the location as time model, the model comparison module 112 may be configured to indicate that a region associated with the second metadata 120 is unknown. Alternatively, the model comparison module 112 may determine a probability matrix of possible regions to associate with the second metadata 120 based on a proximity of the second time 128 to one or more time windows included in the location as time model 134.

In some implementations, in response to the model comparison module 112 identifying a region to associate with a data item, the computing device 102 may update the data item's metadata to indicate the region. In addition, or in the alternative, the computing device 102 may maintain the location as time model 134 and perform region determinations for data items on demand. In some examples, the computing device 102 stores the location as time model 134 in the memory 106. While not illustrated, the computing device 102 may be configured to output an indication that the second data item originated in the region 130 to a display or to another device. In addition, or in the alternative, the computing device 102 may trigger one or more location-based services based on the determination. For example, the computing device 102 may embed location-based advertisements into the second data item.

Thus, FIG. 1 illustrates a system that may determining a region in which data was generated. In particular, the system relates location of a user to time and uses this relationship to identify regions in which data items are generated. Thus, the system may provide a more complete understanding of where data items are generated or transacted as compared to other systems.

Figure 2:
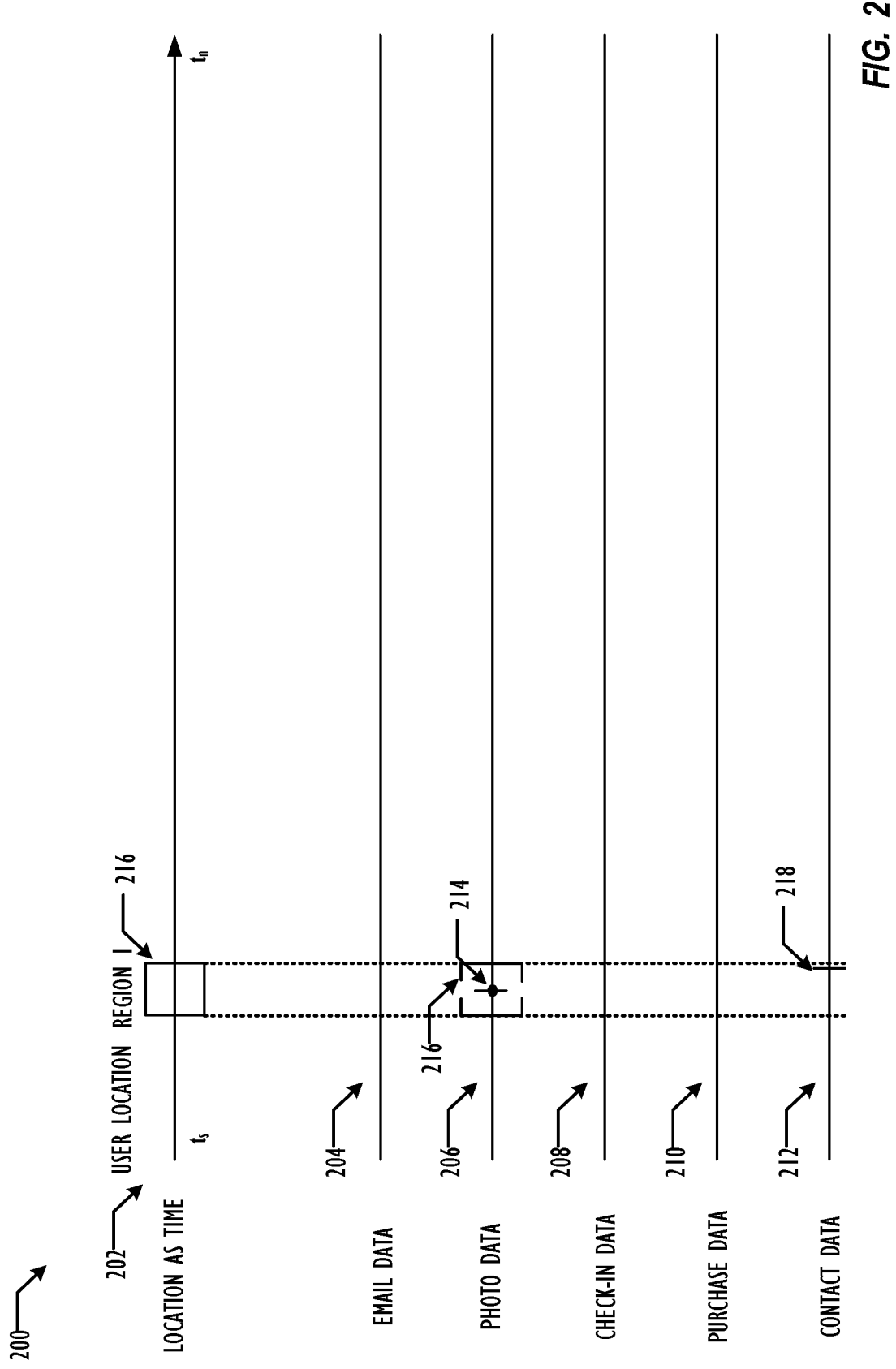
FIG. 2 is a first diagram illustrating generation of a location as time model.

Referring to FIG. 2, a first diagram 200 illustrating generation a location as time model is shown. The diagram 200 depicts a location as time model 202 associated with a user. The location as time model 202 may be generated by the system 100 of FIG. 1 and may correspond to the location as time model 134 of FIG. 1. In the example of FIG. 2, the location as time model 202 is generated by a system that monitors email data 204, photo data 206, check-in data 208, purchase data 210, and contact data 212.

The photo data includes a photo data item 214. The photo data item 214 corresponds to metadata (e.g., the first metadata 118) indicating a first time and a location. Based on the location associated with the photo data item 214, the system determines a region in which the photo data item 214 was generated. In the illustrated example, the system (e.g., the region determination module 114) determines that the photo data item 214 was generated in Region 1 based on location data of the photo data item 214 identifying a location in Region 1 (e.g., a particular city within Region 1). The system (e.g., the time window determination module 116) further determines a time window 216 based on the time at which the photo data item 214 was generated and an estimated amount of time it would take the user to exit Region 1 when starting from the location. The system (e.g., the model generation/updating module 110) updates the location as time model 202 by adding the time window 216 to the location as time model 202. Accordingly, the illustrated example of FIG. 2 shows that the user was in Region 1 during the time window 216. Based on the location as time model 202, the system (e.g., the model comparison module 112) may determine that a contact data item 218 generated by the user (e.g., a device or account of the user) during the time window 216 was also generated in Region 1.

Figure 3:
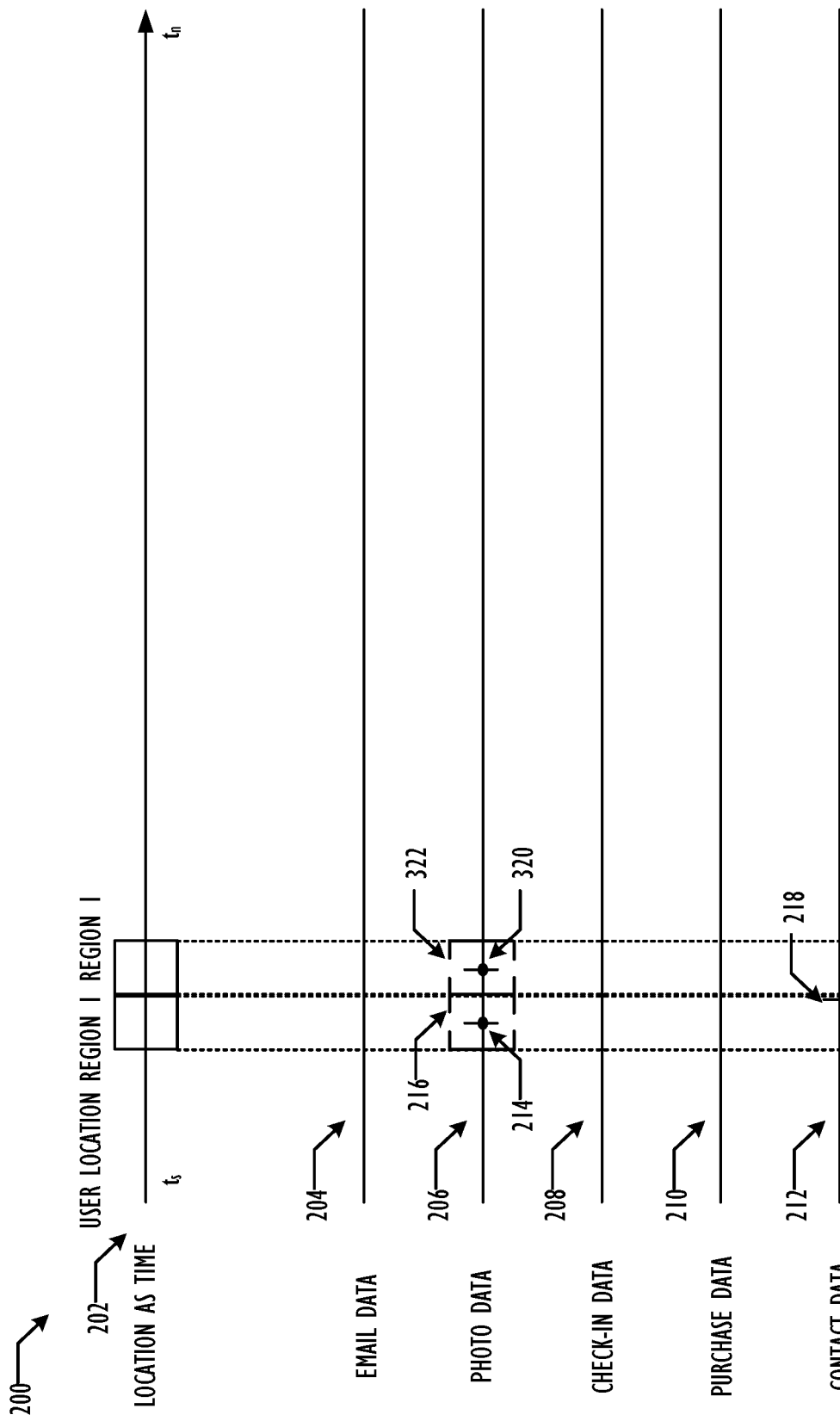
FIG. 3 is a second diagram illustrating generation of the location as time model.

Referring to FIG. 3, a diagram 300 illustrating a process to update the location as time model 202 of FIG. 2 is shown. In the illustrated example, the system generating and maintaining the location as time model 202 identifies a second photo data item 320. The second photo data item 320 corresponds to metadata indicating a third time and a second location. Based on the second location associated with the second photo data item 320, the system determines a region in which the second photo data item 320 was generated. In the illustrated example, the system (e.g., the region determination module 114) determines that the second photo data item 320 was generated at a second location (e.g., a second city) in Region 1. The system (e.g., the time window determination module 116) further determines a second time window 322 based on the third time at which the photo data item 214 was generated and a second estimated amount of time it would take the user to exit Region 1 when starting from the second location. The system (e.g., the model generation/updating module 110) updates the location as time model 202 by adding the second time window 322 to the location as time model 202. In response to determining that the time window 216 and the second time window 322 overlap in time and are associated with the same region, the system may merge the time windows 216, 322 in the location as time model 202.

Figure 4:
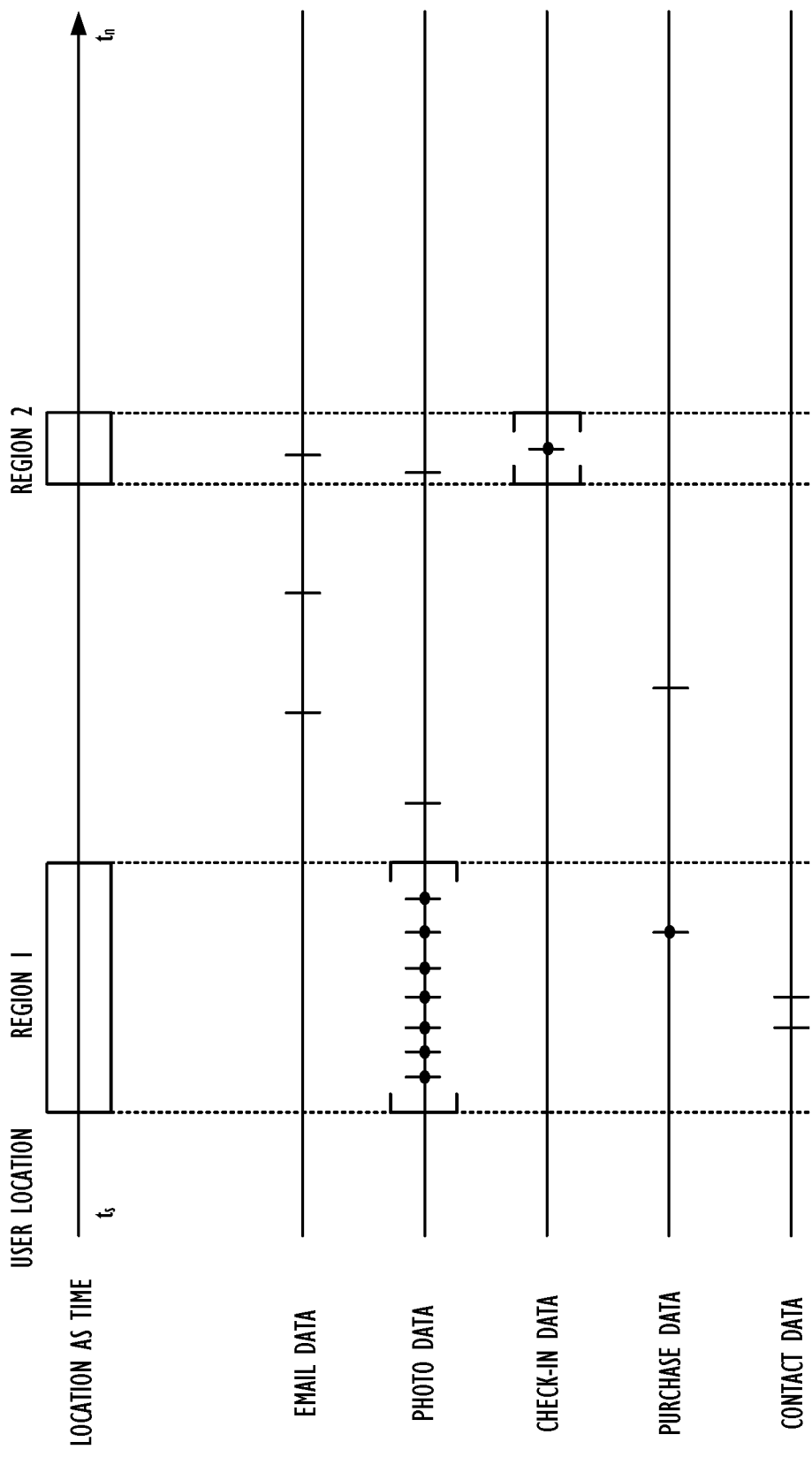
FIG. 4 is a diagram illustrating an updated version of the location as time model.

Referring to FIG. 4, a diagram 400 illustrating an updated version of the location as time model 202 of FIG. 2 is shown. As illustrated in FIG. 4, the location as time model 202 indicates that a user was located in Region 1 during a first time window 404 and located in Region 2 during a second time window 406. In the illustrated example, the first time window 404 is identified (e.g., by the processor(s) 104) based on the photo data items 214, 320, additional photo data items 430-438, and purchase data item 442. The second window time 406 is identified (e.g., by the processor(s) 104) based on a social media check-in data item 440.

Thus, the location as time model 202 identifies time windows during which the user was in particular regions. Using the location as time model 202, a system (e.g., the model comparison module 112) may determine a region for a data item that does not include location data by identifying a corresponding time window. In the illustrated example, such a system may determine that the contact data item 218 and a second contact data item 460 were generated in Region 1 by determining that timestamps associated with the contact data items 218, 460 fall within the first time window 404. Similarly, the system may determine that a first E-mail data item 462 and a third photo data item 464 were generated while the user was in Region 2 by determining that timestamps associated with the first E-mail data item 462 and the third photo data item 464 fall within the second time window 406.

Further, the system (e.g., the model comparison module 112) may predict a region for a data item associated with a time that does not fall within any time windows identified by the location as time model 202. The prediction may be based on regions identified by the location as time model 220 as occurring before and/or after the time associated with the data item, a predicted speed of the user, travel history of the user, etc. For example, a second purchase data item 480 may fall outside of the time windows 404, 406 of the location as time model 202 depicted in FIG. 4. The system (e.g., the model comparison module 112) may identify that the user was in Region 1 before and in Region 2 after the second purchase data item 480 was generated. Based on a travel history of the user, a predicted speed of the user, a proximity in time of the second purchase data item 480 to the first time window 404 and/or the second time window 406, or a combination thereof, the system (e.g., the model comparison module 112) may determine a probability that the second purchase data item 480 was generated in Region 1 and a probability that the second purchase data item 480 was generated in Region 1. The system (e.g., the model comparison module 112) may further determine probabilities that the second purchase data item 480 was generated in a region proximate to or in between Region 1 and/or Region 2.

Thus, FIG. 2-4 illustrate specific examples of a location as time model. The location as time model may be used to identify a region in which a data item that is not associated with location data was generated Referring to FIG. 5, a flowchart illustrating a method 500 of determining a region in which data was generated is shown. The method 500 may be performed by a computing device, such as the computing device 102 of FIG. 1. The method 500 includes obtaining first metadata corresponding to a first data item, the first metadata indicating a user, a location, and a first time, at 502. For example, the processor(s) 104 may receive and/or generate the first metadata 118.

The first metadata 118 is associated with a first data item, such as an image file, an E-mail, a social media check-in event, a purchase event, a contact entry, etc. The first metadata 118 indicates the user 122, the location 124, and the first time 126.

The method 500 further includes identifying a region that includes the location, at 504. For example, the region determination module 114 may determine the region 130 that includes the location 124 indicated by the first metadata 118. To illustrate, the region determination module 114 may track a particular list of regions and may perform a search of the tracked regions to identify which tracked region includes the location 124.

The method 500 further includes identifying a time window associated with the user being located in the region based on the first time and an estimated amount of time it would take the user to exit the region when starting from the location, at 504. For example, the time window determination module 116 may determine the time window 132 based on the first time 126 and an estimated amount of time it would take the user 122 to exit the region 130 when starting from the location 124. To illustrate, the time window determination module 116 may determine (e.g., estimate) that exiting the region 130 while traveling from the location 124 at a predicted speed would take a particular amount of time and set the time window 132 to be the first time 126±the particular amount of time. The time window 132 identifies a period of time during which the user 122 is identified as having been in the region 130.

The method 500 further includes obtaining second metadata corresponding to a second data item, the second metadata indicating the user and a second time, at 508. For example, the processor(s) 104 may receive and/or generate the second metadata 120. The second metadata 120 is associated with a second data item, such as an image file, an E-mail, a social media check-in event, a purchase event, a contact entry, etc. The second metadata 120 indicates the user 122 and the second time 128.

The method 500 further includes, in response to determining that the second time is within the time window, determine that the second data item was generated with the region, at 510. For example, the model comparison module 112 may compare the second time 128 to the location as time model 134 to determine that the second time 128 corresponds to the time window 132. Accordingly, the model comparison module 112 may determine that the second metadata 120 was generated by the user 122 in the region 130.

Figure 5:
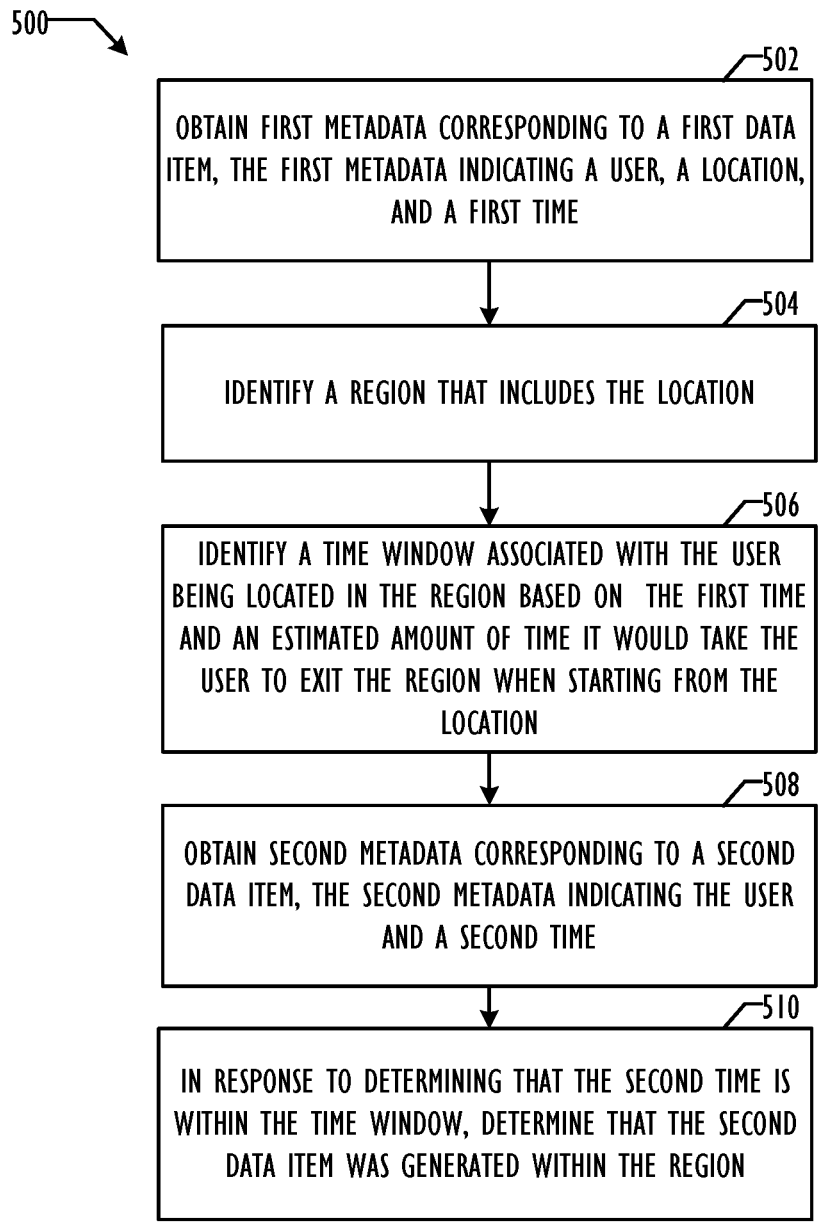
FIG. 5 is a flowchart illustrating a method of determining a region in which data was generated.

Thus, FIG. 5 illustrates an example of a method that may be used to determine a region in which data was generated. Accordingly, the method may be used to provide one or more location-based services associated with data even in situations where the data does not include location information.

Figure 6:
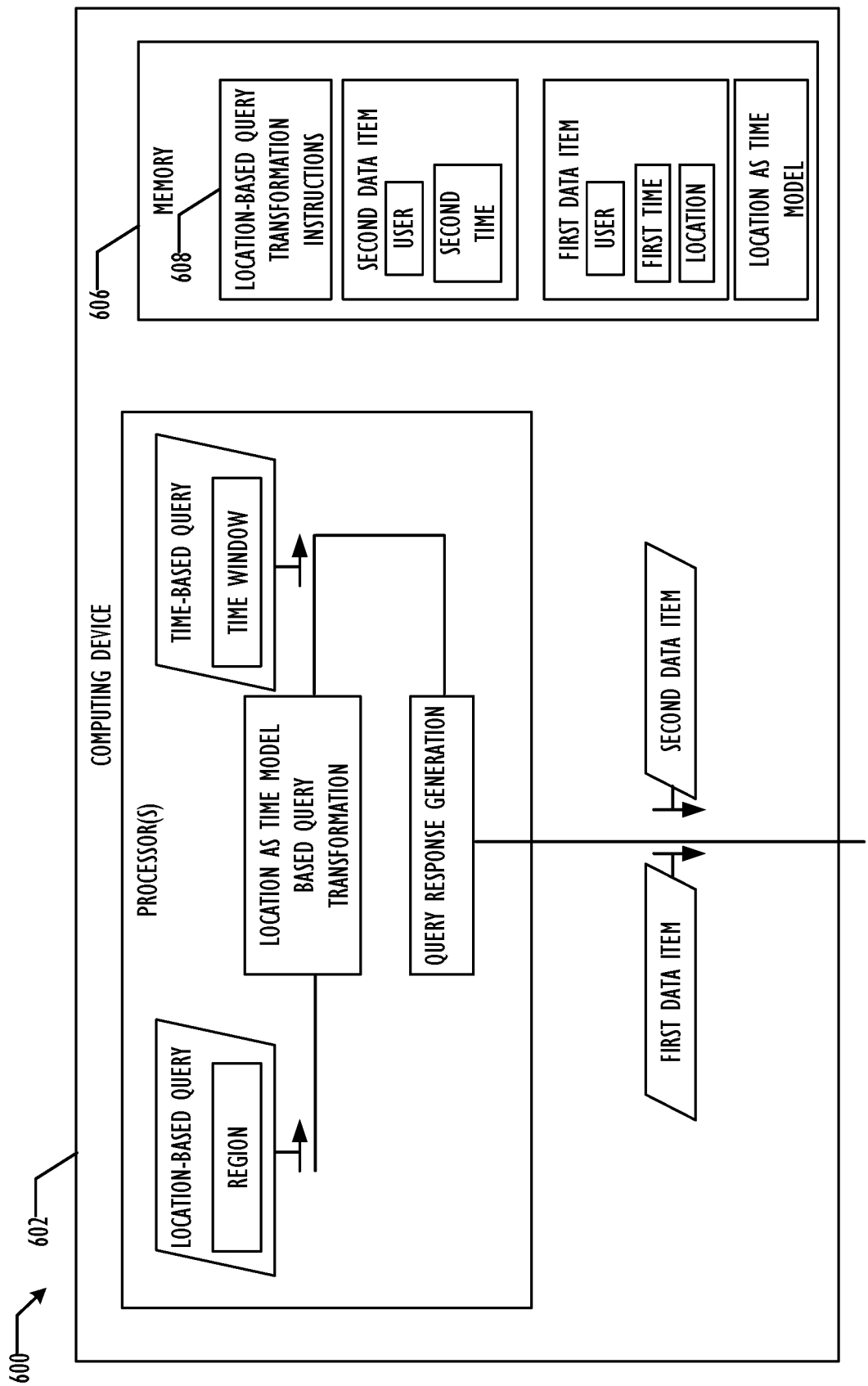
FIG. 6 is a block diagram illustrating a system for converting a location-based query to a time-based query.

Referring to FIG. 6, a block diagram illustrating a system 600 for converting a location-based query to a time-based query, according to one or more embodiments, is presented. The system 600 includes a computing device 602. The computing device 102 may correspond to a server device or to any other type of computing device. In some implementations, the system 600 corresponds to the system 100. For example, the computing device 602 may correspond to the computing device 102.

The computing device 602 includes one or more processors 604 and a memory 606.

The processor(s) 604 may include a central processor unit (CPU), a digital signal processor (DSP), a graphics processing unit (GPU), some other type of processor, or a combination thereof. The memory 606 includes a hard disk drive, a flash drive, random access memory, any other type of computer readable storage device, or a combination thereof. The memory 606 may store data and executable code. In the illustrated example, the memory 606 stores location-based query transformation instructions 608. The location-based query transformation instructions 608 may be executable by the processor(s) 604 to perform any of the operations or methods described herein. The memory 606 further stores first metadata 622 corresponding to a first data item. The first metadata 622 indicates a user 610, a first time 614, and a location 616 associated with the first data item. The first metadata 622 may correspond to the first metadata 118 of FIG. 1. The memory 606 further stores second metadata 620. The second metadata 620 indicates the user 610 and a second time 612 associated with a second data item. The second metadata 620 may correspond to the second metadata 120 of FIG. 1. The second metadata 620 further includes a location as time model 624 generated by the processor(s) 604 based on the first metadata 622 as described herein with reference to FIGS. 1-5. The location as time model 624 may correspond to the location as time model 134 of FIG. 1 or the location as time model 202 of FIGS. 2-4.

The processor(s) 604 include a location as time model query transformation module 630 and a query response generation module 632. The location as time model based query transformation module 630 is configured to transform location-based queries into time-based queries based on the location as time model 624. The query response generation module 632 is configured to generate results that identify data items satisfying a time-based query. Each of the modules 630-632 may correspond to software executed by the processor(s) 604 responsive to the location-based query transformation instructions 608, dedicated hardware of the processor(s) 604, or a combination thereof. While illustrated as distinct modules, functionality the modules 630-632 may be combined. Further, functionality of one or more of the modules 630-632 may be separated into multiple distinct modules.

In operation, the computing device 602 receives a location-based query 634 for data items generated within a region 638. In some implementations, the location-based query 634 is received from another computing device (e.g., via network). For example, the computing device 602 may expose to the Internet an application programming interface (API) configured to receive location-based queries. In other examples, the location-based query 634 is received via a graphical user interface generated and displayed by the computing device 602.

The location as time model based query transformation module 630 identifies a time window 640 associated with region 638 based on the location as time model 624 and converts the location-based query 634 into a time-based query 636 for data items generated within the time window 640. In an illustrative example, the location-based query 634 is for all data items generated by User 1 in Region 1. Accordingly, the location as time model based query transformation module 630 may identify the time window 640 based on the location as time model 624 indicating the time window 640 corresponds to User 1 being in Region 1.

In some implementations, the location as time model based query transformation module 630 may include more than one time window in a time-based query. For example, in response to determining that User 1 was in Region 1 during both a first time window and a second time window, the location as time model based query transformation module 630 may generate a time-based query for data items generated during the first time window or the second time window.

It should be noted that in some examples, the location-based query 634 includes a time-based component and that the location as time model based query transformation module 630 may identify the time window 640 based further on the time-based component. For example, the location-based query 634 may be for data items generated by User 1 in Region 1 during a particular time period (e.g., a year). Accordingly, the location as time model based query transformation module 630 may identify the time window 640 in the time-based query 636 in response to determining that the time window 640 corresponds to both Region 1 and the particular time period.

The query response generation module 632 generates a result 642 based on the time-based query 636. For example, the query response generation module 632 may generate the result 642 indicating the first data item corresponding to the first metadata 622 and the second data item corresponding to the second metadata 620 in response to the first time 614 and the second time 612 respectively falling within the time window 640. The query response generation module 632 may initiate transmission of the result 642 to a querying device, initiate display of the result 642 at the computing device 602, or a combination thereof. In some examples, the computing device 602 transmits the time-based query 636 to a querying device in addition to or instead of the result 642. Thus, the computing device 602 may provide a location-based query resolution service and/or a location-based query transformation service.

Therefore, FIG. 6 illustrates a system for converting a location-based query to a time-based query that may be resolved for data items that do not include location data. The time-based query may be used to identify data items predicted to have been generated within a particular region even if the data items are not associated with location data.

Figure 7:
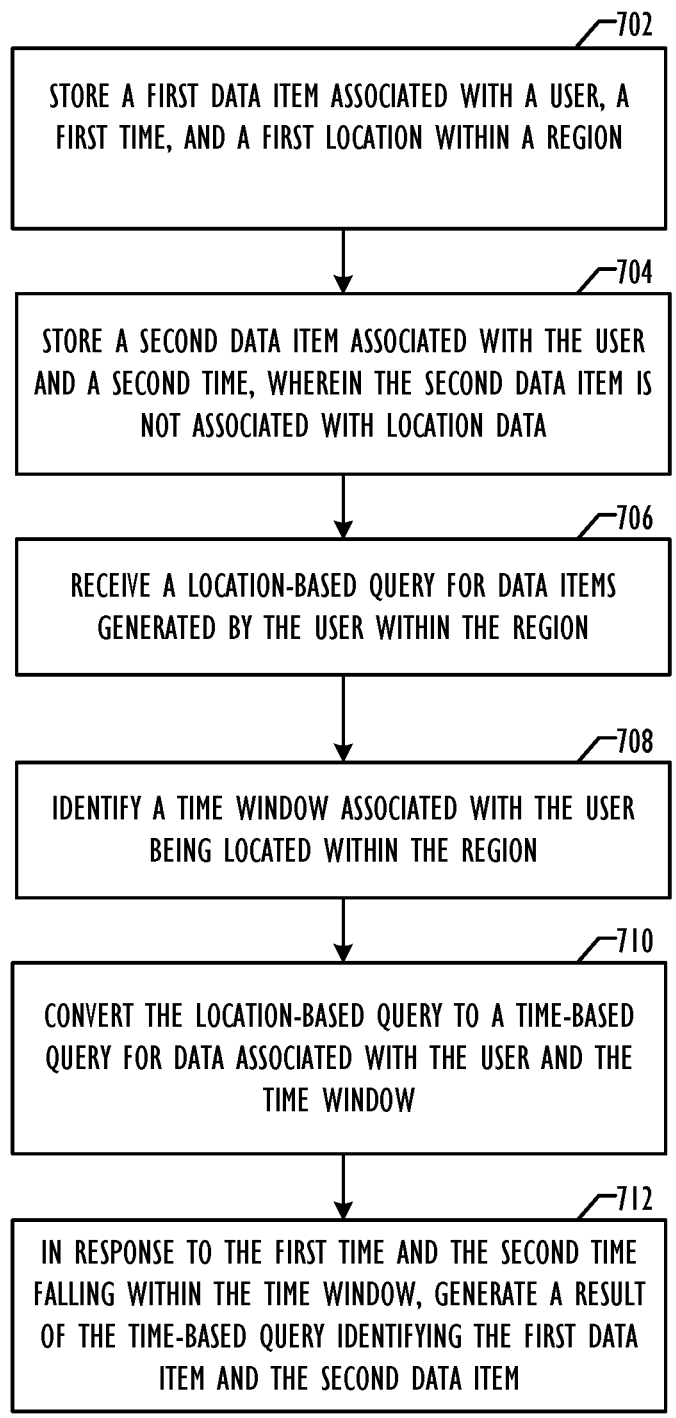
FIG. 7 is a flowchart illustrating a method for converting a location-based query to a time-based query.

Referring to FIG. 7, a flowchart illustrating a method 700 of converting a location-based query to a time-based query is shown. The method 700 may be performed by a computing device, such as the computing device 602 of FIG. 6. The method 700 includes storing first metadata corresponding to a first data item, the first metadata indicating a user, a first time, and a first location within a particular region, at 702. For example, the computing device 602 may store the first metadata 622 in the memory 606. The first metadata 622 is associated with a first data item and indicates the user 610, the first time 614, and the location 616.

The method 700 further includes storing second metadata corresponding to a second data item, the second metadata indicating the user and a second time, wherein the second metadata does not include the location data, at 704. For example, the computing device 602 may store the second metadata 620 in the memory 606. The second metadata 620 is associated with a second data item and indicates the user 610 and the second time 612. The second metadata 620 may not include location data.

The method 700 further includes identifying a time window associated with the user being located within the particular region based on the first metadata, at 706. For example, the processor(s) 604 may construct the location as time model 624 identifying that the time window 640 corresponds to the region 638 based on the first metadata 622 according to the process described with reference to FIGS. 1-5.

The method 700 further includes receiving a location-based query for data items generated by the user within a queried region, at 708. For example, the computing device 602 may receive the location-based query 634 for data items generated by the user 610 within the region 638.

The method 700 further includes, in response to the queried region matching the particular region, converting the location-based query to a time-based query for data items generated by the user within the time window, at 710. For example, in response to determining that the region 638 included in the location-based query 634 matches a region included in the location as time model 624, the location as time model based query transformation module 630 may transform the location-based query 634 into the time-based query 636 based on the location as time model 624. The time-based query 636 may correspond to a request for data items generated by the user 610 within the time window 640.

The method 700 further includes, in response to the first time and the second time falling within the time window, generating a result of the time-based query identifying the first data item and the second data item, at 712. For example, the query response generation module 632 may generate the result 642 identifying the first data item and the second data item based on the first time 614 and the second time 612 respectively falling within the time window 640 identified by the time-based query 636.

Thus, the method 700 may be used by a device to transform location-based queries for data items into time-based queries for data items. Accordingly, the method 700 may be used to generate a query that may identify data items that may have been generated in a region even in cases where the data items do not include location data.

Figure 8:
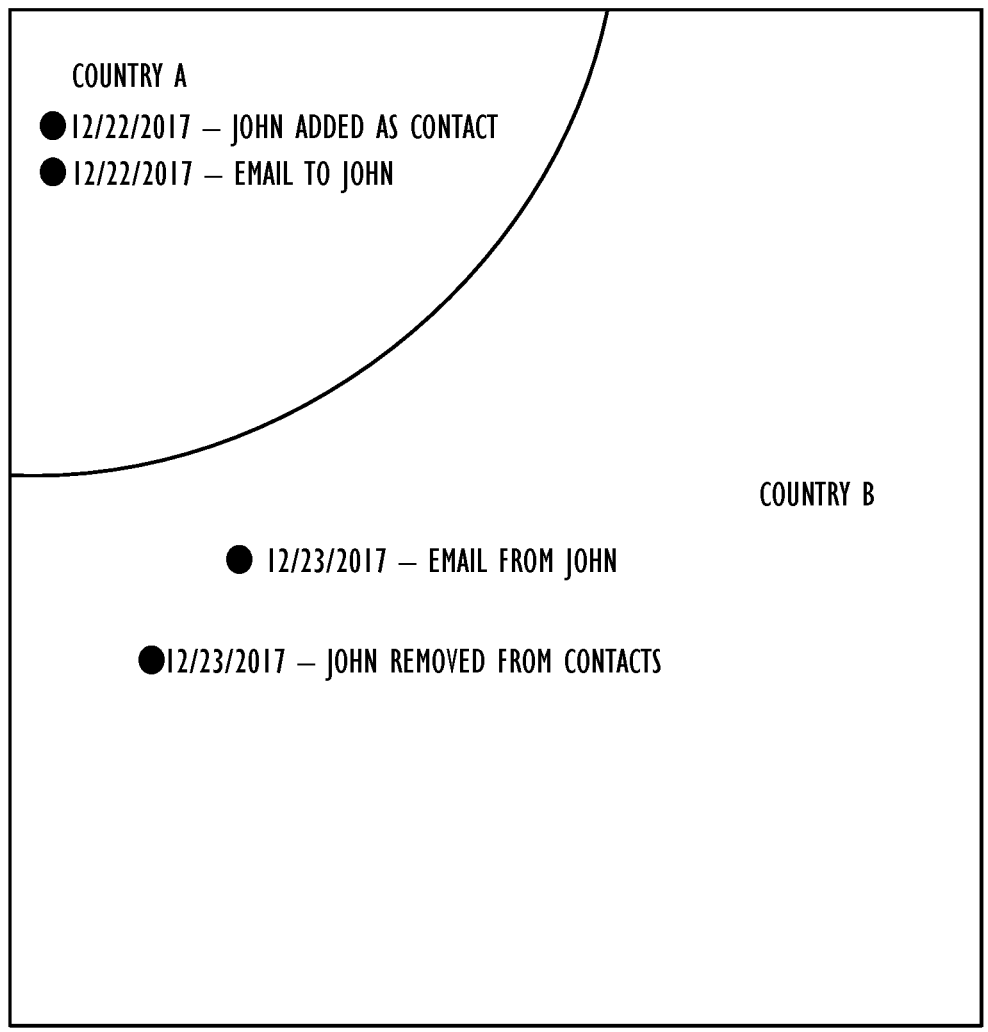
FIG. 8 is a diagram illustrating results of a time-based query displayed on a map.

Results generated by the computing device 602 and/or the method 700 may be displayed on a map. For example, the result 642 may correspond to a graphical user interface depicting a map illustrating data items generated in the region 638. FIG. 8 depicts a map 800 that illustrates results one or more query results. While the map 800 illustrates data items generated in a country A (e.g., a first region) and a country B (e.g., a second region), the data items depicted on the map 800 may not have included location data when identified (e.g., by the processor(s) 604) for inclusion in the map 800. For example, in response to receiving a location-based query for data items generated by User 1 in country A or in country B, the processor(s) 604 may use the location as time model 624 to identify a first time window during which User 1 was in country A and a second time window during which User 1 was in country B. The processor(s) 604 may then transform the location-based query into a time-based query for data items generated by User 1 during the first time window or during the second time window. The processor(s) 604 may determine results of the time-based query and generate the map 800 accordingly. Thus, data items that do not include location data may be placed on a map according to some embodiments.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Further, the various actions may occur in a different grouping, or by different devices. Many other embodiments will be apparent to those of skill in the art upon reviewing the above description. The scope of the invention should therefore be determined with reference to the appended claims, along with the full scope of equivalents to which such claims are entitled.

What is claimed is:

1. A computer-implemented method, the method comprising:
   receiving, from a user, a location-based query associated with a first region, wherein the location-based service generates different data items determined by a device or via a sensor in the first region;
   determining that the location-based query is required to be converted to a time-based query for a determination of a data item as a response to the location-based query;
   retrieving a time model associated with the user based on a first time window associated with a first location in the first region where the user is located, wherein the first time window is based on first metadata generated when the user is located at the first location and a first estimated amount of time for the user to exit the first region when starting from the first location;
   determining a second time window associated with a second location is the first region based on second metadata generated when the user is located at the first location and a second estimated amount of time for the user to exit the first region when starting from the second location;
   resolving a conflicting portion of the first time window and the second time window based on a priority of each of the first location and the second location;
   updating the time model based on the resolved first and second time windows;
   determining at least one additional time model associated with a second region and having second metadata associated with the user located in the second region;
   converting the location-based query to the time-based query based on the updated time model and the at least one additional time model;
   determining that the data item was generated in the first region by the device or via the sensor in association with the user being located at one or more of the first location or the second location based on the time model and the location-based service; and
   predicting that the data item is the response to the location-based query based on the determining that the data item was generated in the first region.

2. The computer-implemented method of claim 1, wherein the first metadata comprises at least one of an email, a text message communication, a photo, a video, check-in data, a purchase, or a contact of the user.

3. The computer-implemented method of claim 1, wherein, prior to the retrieving the time model, the computer-implemented method further comprises:
   acquiring the first metadata comprising a first time when the first metadata was generated and the first location; and
   identifying the first location in the first region based on the first metadata.

4. The computer-implemented method of claim 3, wherein, prior to the determining the second time window, the computer-implemented method further comprises:
   acquiring the second metadata comprising a second time when the second metadata was generated and the second location; and
   identifying the second location in the first region based on the second metadata.

5. The computer-implemented method of claim 1, wherein the resolving the conflicting portion of the first time window and the second time window comprises:
   merging the first time window and the second time window during the conflicting portion based on the priority; and
   removing a corresponding conflicting portion of one of the first time window or the second time window after the merging.

6. The computer-implemented method of claim 1, wherein the first time window is based on a first time when the first metadata was generated using a mobile device of the user, and wherein the first estimated amount of time is based on an estimated time of day when the user exits the first region after starting from the first location.

7. A system comprising:
   a non-transitory memory; and
   one or more hardware processors coupled to the non-transitory memory and configured to read instructions from the non-transitory memory to cause the system to perform operations comprising:
      receiving, from a user, a location-based query associated with a location-based service for a first region, wherein the location-based service generates different data items determined by a device or via a sensor in the first region;
      determining that the location-based query is required to be converted to a time-based query for a determination of a data item as a response to the location-based query;
      retrieving a time model associated with the user based on a first time window associated with a first location in the first region where the user is located, wherein the first time window is based on first metadata generated when the user is located at the first location and a first estimated amount of time for the user to exit the first region when starting from the first location;
      determining a second time window associated with a second location is the first region based on second metadata generated when the user is located at the first location and a second estimated amount of time for the user to exit the first region when starting from the second location;
      resolving a conflicting portion of the first time window and the second time window based on a priority of each of the first location and the second location;
      updating the time model based on the resolved first and second time windows;
      determining at least one additional time model associated with a second region and having second metadata associated with the user located in the second region;
      converting the location-based query to the time-based query based on the updated time model and the at least one additional time model;
      determining that the data item was generated in the first region by the device or via the sensor in association with the user being located at one or more of the first location or the second location based on the time model and the location-based service; and
      predicting that the data item is the response to the location-based query based on the determining that the data item was generated in the first region.

8. The system of claim 7, wherein the first metadata comprises at least one of an email, a text message communication, a photo, a video, check-in data, a purchase, or a contact of the user.

9. The system of claim 7, wherein, prior to the retrieving the time model, the operations further comprise:

acquiring the first metadata comprising a first time when the first metadata was generated and the first location; and identifying the first location in the first region based on the first metadata.

10. The system of claim 9, wherein, prior to the determining the second time window, the operations further comprise:

acquiring the second metadata comprising a second time when the second metadata was generated and the second location; and identifying the second location in the first region based on the second metadata.

11. The system of claim 7, wherein the resolving the conflicting portion of the first time window and the second time window comprises:

merging the first time window and the second time window during the conflicting portion based on the priority; and removing a corresponding conflicting portion of one of the first time window or the second time window after the merging.

12. The system of claim 7, wherein the first time window is based on a first time when the first metadata was generated using a mobile device of the user, and wherein the first estimated amount of time is based on an estimated time of day when the user exits the first region after starting from the first location.

13. A non-transitory computer-readable medium having stored thereon instructions executable by a computer system to cause the computer system to perform operations comprising:

receiving, from a user, a location-based query associated with a location-based service for a first region, wherein the location-based service generates different data items determined by a device or via a sensor in the first region;

determining that the location-based query is required to be converted to a time-based query for a determination of a data item as a response to the location-based query;

retrieving a time model associated with the user based on a first time window associated with a first location in the first region where the user is located, wherein the first time window is based on first metadata generated when the user is located at the first location and a first estimated amount of time for the user to exit the first region when starting from the first location;

determining a second time window associated with a second location is the first region based on second metadata generated when the user is located at the first location and a second estimated amount of time for the user to exit the first region when starting from the second location;

resolving a conflicting portion of the first time window and the second time window based on a priority of each of the first location and the second location;

updating the time model based on the resolved first and second time windows;

determining at least one additional time model associated with a second region and having second metadata associated with the user located in the second region;

converting the location-based query to the time-based query based on the updated time model and the at least one additional time model;

determining that the data item was generated in the first region by the device or via the sensor in association with the user being located at one or more of the first location or the second location based on the time model and the location-based service; and predicting that the data item is the response to the location-based query based on the determining that the data item was generated in the first region.

14. The non-transitory computer-readable medium of claim 13, wherein the first metadata comprises at least one of an email, a text message communication, a photo, a video, check-in data, a purchase, or a contact of the user.

15. The non-transitory computer-readable medium of claim 13, wherein, prior to the retrieving the time model, the operations further comprise:

acquiring the first metadata comprising a first time when the first metadata was generated and the first location; and identifying the first location in the first region based on the first metadata.

16. The non-transitory computer-readable medium of claim 15, wherein, prior to the determining the second time window, the operations further comprise:

acquiring the second metadata comprising a second time when the second metadata was generated and the second location; and identifying the second location in the first region based on the second metadata.

17. The non-transitory computer-readable medium of claim 13, wherein the resolving the conflicting portion of the first time window and the second time window comprises:

merging the first time window and the second time window during the conflicting portion based on the priority; and removing a corresponding conflicting portion of one of the first time window and the second time window after the merging.

* * * * *